United States Patent [19]

Wu

[11] Patent Number: 5,260,826
[45] Date of Patent: Nov. 9, 1993

[54] NONSCANNING SECTIONING MICROSCOPE

[75] Inventor: Shudong Wu, Torrance, Calif.

[73] Assignee: Physical Optics Corporation, Torrance, Calif.

[21] Appl. No.: 823,262

[22] Filed: Jan. 21, 1992

[51] Int. Cl.⁵ .......................... G02B 21/00; G02B 3/00
[52] U.S. Cl. .................................... 359/368; 359/383; 359/722; 359/739
[58] Field of Search ................................ 359/368–390, 359/454–458, 558, 568, 618, 624, 722–723, 738–743, 885, 891, 709; 355/33–35, 44, 55, 56, 64, 71; 250/201.3, 201.8

[56] References Cited

U.S. PATENT DOCUMENTS

| | | | |
|---|---|---|---|
| 4,585,948 | 4/1986 | Schneider et al. | 359/619 |
| 4,621,897 | 11/1986 | Bonnet | 359/619 |
| 4,813,762 | 3/1989 | Leger et al. | 359/565 |
| 5,148,323 | 9/1992 | Campbell et al. | 359/738 |

Primary Examiner—Bruce Y. Arnold
Assistant Examiner—Thong Nguyen
Attorney, Agent, or Firm—Nilles & Nilles

[57] ABSTRACT

A device for microscopic sectioning and imaging of an object specimen illuminated with light comprises an objective lens, a diaphragm, and a pixel filter array. The objective lens focuses light from the object specimen to an image focal plane. The diaphragm blocks a portion of the focused light from the objective lens thereby creating a shadow. Each pixel filter in the pixel filter array has an axis and is arranged so as to cooperate with the shadow so that light from an object focal plane and parallel to the pixel filter axes reaches an output image plane.

10 Claims, 7 Drawing Sheets

OUTPUT IMAGE PLANE

FOCAL DEPTH REGION

NONSCANNING SECTIONING MICROSCOPE

BACKGROUND OF THE INVENTION

1. Field of the Invention

This invention pertains to 3-dimensional imaging. More particularly, this invention relates to sectioning microscopes which reject light from all out-of-focus planes and form a sharp sectioned image of the object specimen.

2. Background of the Prior Art

The demand for 3-dimensional (3-D) imaging is dramatically increasing in such fields as biomedicine, clinical diagnosis, and ophthalmology. The sectioning, or depth discrimination capability, of a microscope can be characterized by the variation of the total power in the image of a point source as it is scanned through the focus. Conventional microscopes are nonscanning parallel processing systems which image the entire object field simultaneously and do not have imaging sectioning capability. As shown in FIG. 1, the power received from plane 1 (out of focus) is the same as that received from plane 2 (in-focus). The light from unfocused portions of the object falls onto the image plane along with the light from the focused portion of the object, thereby contaminating the focused image with a strong blurred background. The total power in a conventional microscope is constant in the image of a point source during defocus. 3-D data (both the axial and lateral light energy distribution) cannot be obtained from a conventional microscope.

In recent years, scanning confocal microscopy has rapidly developed to meet the 3-D imaging demand. Confocal microscopes can well reject the light from all out-of-focus planes and form a very sharp sectioned image of the object. In a standing confocal microscope, the point spread function can be expressed as the fourth power of a coherent point spread function. The curve representing the integrated intensity variation with the focus is shown in FIG. 2 and demonstrates that the confocal microscope possesses good depth discrimination capability. When the defocus is equal to the focal depth ($u=3$), the power drops to 70%. At twice the focal depth ($u=6$), the power drops to 20%. However, to gain this sectioning capability, the confocal microscope has to sacrifice image acquisition speed.

A confocal microscope uses a point light source and a point detector, and therefore the image data must be scanned pixel by pixel, which is undesirably slow. First, the available photon number for each pixel is severely limited by the scanning speed. For example, for an image width 1000×1000 pixels, the photon collecting time for each pixel is only one millionth of the frame time. Second, a complicated and expensive scanning device (either mechanical or acoustic), has to be used. Third, the instrument requires critical alignment. Consequently, confocal microscopes are inefficient, complicated, expensive and difficult to maintain. Confocal microscope technology is explained in T. Wilson, "Confocal Microscopy" Academic Press (1990) incorporated herein by reference.

A microscope which can reject light from all out-of-focus planes and can form a sharp sectioned image of the object without the inefficiencies of confocal microscopes caused by complex and expensive scanning and alignment devices would be of great benefit.

SUMMARY OF THE INVENTION

A sectioning microscope which filters out all light from out-of-focus object planes without scanning is presented. Specifically, the nonscanning sectioning microscope of the present invention comprises a standard objective lens system, a diaphragm, and a pixel filter array comprising a plurality of individual pixel filters each having an axially aligned microlens, absorbent channel, and pinhole.

In one embodiment, light of the desired wavelength from an object element on the specimen is incident the objective lens and is focused to an image focal plane. Due to diffraction, the focused light has a focal point surrounded by a finite focal depth region. The diaphragm projects symmetrical shadows outside the focal depth region. Within the focal depth region, the wavefront curvature varies from finite nearest the diaphragm to zero at the image focal plane.

The pixel filter array discriminates against all light which originates from object elements outside of a desired, predetermined object focal plane. The microlenses of the plurality of pixel filters refocus the light to an output image plane through the absorbent channels having light absorbing walls, which optically couple the microlens array to the pinhole array and allow substantially only light from object elements in the predetermined object focal plane to reach the output image plane. Virtually all other light is absorbed by the absorbent channel walls and blocked by the pinhole array.

When the light incident the microlens originates from an object element in the predetermined object focal plane and the microlens is located at the image focal plane, the microlens refocuses the planar wavefront of the light and directs it through the pinhole and onto the output image plane with small attenuation.

When light originating from an object element outside the object focal plane is incident the microlens and the microlens is off the image focal plane but within the focal depth region, the microlens diverges the light, which at that point consists of a finite wavefront curvature, and causes high attenuation by the walls of the corresponding absorbent channel. The corresponding pinhole further attenuates the light so that very little light reaches the output image plane.

When light originating from an object element outside the object focal plane is incident the microlens and the microlens is off the image focal plane and outside the focal depth region and is in the shadow region produced by the central diaphragm, virtually no light can enter the pixel filter or be transmitted to the output image plane.

Specifically with respect to off-axis light, i.e. when the elementary light beam is not aligned with the axis of a particular pixel filter, the image, as reformed by the microlens, will not be on the corresponding pinhole but instead will be absorbed by the corresponding absorbent channel so that virtually no off-axis light is transmitted to the output image plane.

In a further embodiment of the present invention, particularly directed to insuring that the light which enters the pixel filters is parallel to the axis of the pixel filters, a field lens may be located axially at the image focal plane between the pixel filter array and the diaphragm to insure paraxiality of the light entering the pixel filters. The field lens ensures that the central light rays from all object elements on the object specimen will be parallel to the axis of the pixel filters in the pixel filter array and perpendicular to the output image plane.

DESCRIPTION OF THE PREFERRED EMBODIMENTS

Figure 3:
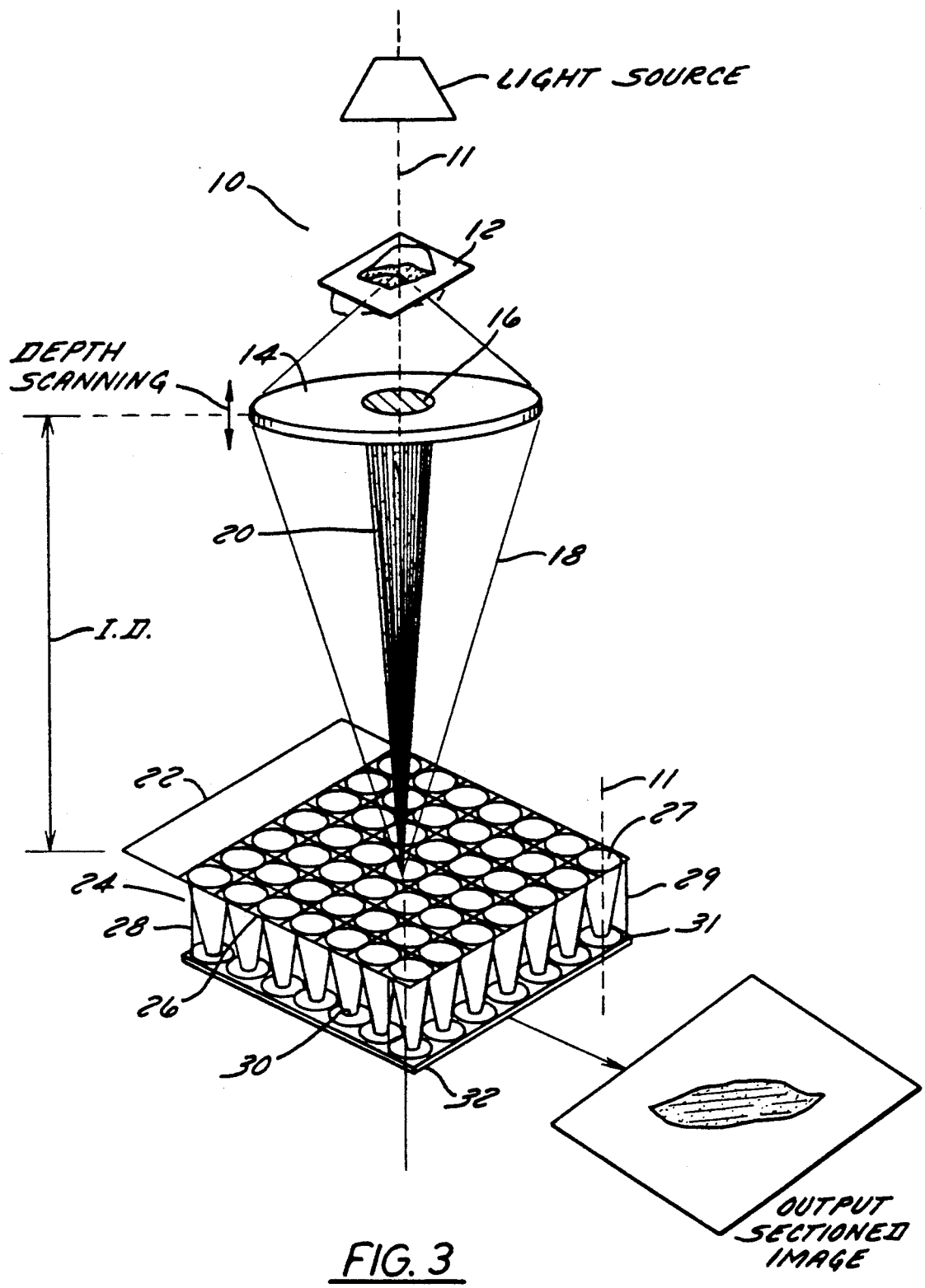
FIG. 3 is a schematic of the nonscanning sectioning microscope of the present invention.

Referring to FIG. 3, a nonscanning sectioning microscope 10 of the present invention is illustrated. The nonscanning sectioning microscope 10 has a central axis 11 and comprises an object focal plane 12, objective lens 14, central diaphragm 16, light cone 18, shadow cone 20 surrounded by the light cone 18, image focal plane 22, and pixel filter array 24 including microlens array 26, absorbent channel array 28, pinhole array 30 and output image plane 32. The pixel filter array 24 includes a plurality of individual pixel filters comprising exemplary microlens 27, absorbent channel 29, and pinhole 31 aligned on exemplary pixel axis 11'.

The object focal plane 12 defines the desired plane of the 3-D object specimen to be viewed. The objective lens 14 is the imaging system of the microscope and may comprise a conventional microscopic imaging system consisting of one or several lenses located on central axis 11. The objective lens 14 may be manufactured from glass or quartz or other suitable materials by normal techniques. The central diaphragm 16 comprises a material which is opaque to the wavelength of the light used in the microscope, e.g., visible, IR, UV, or others, and may preferably be circular in cross-section. The central diaphragm 16 is located on the central axis 11 as is the objective lens 14, and at the entrance pupil plane of the objective lens 14.

The light cone 18 defines the envelope of light focused by the objective lens 14 from an on-axis object element on the object specimen. The shadow cone 20 within the path of light forming the light cone 18 of the central diaphragm 16 and decreasing in diameter towards the focal plane 22 defines the envelope of the substantially dark area below the central diaphragm 16. The shadow cone 20 is on the central axis 11 and therefore aligned with the objective lens 14 and the central diaphragm 16.

The image focal plane 22 defines the plane in which the light passing through the objective lens from an object element in the predetermined object focal plane 12 comes into focus. The image focal plane 22 coincides with the upper surface of the pixel filter array 24 for on-focus light (i.e., light from an object element in the predetermined object focal plane).

The microlens array 26 comprises a plurality of microlenses each of which defines one pixel having an exemplary pixel axis 11'. The microlens array 26 may comprise a glass lens substrate coated with dielectric material to form each individual microlens 27. The microlens array 26 may also be formed by plastic molding or other conventional microlens techniques. The size of each microlens may preferably be equal to or smaller than the Airy spot of the light cone 18. The Airy spot, as is well-known in the art, is defined as the high intensity innermost core of the focal spot of the light beam or light cone 18. In order to make the microlens array as simple as possible, the Fresnel number of the microlenses is chosen to be equal to one, that is $c^2/\lambda f = 1$. This means that the convergence induced by the microlens just compensates for the diffraction by the microlens edge. The focal spot size on the output pinhole plane is equal to the diameter of the microlens.

Figure 4:
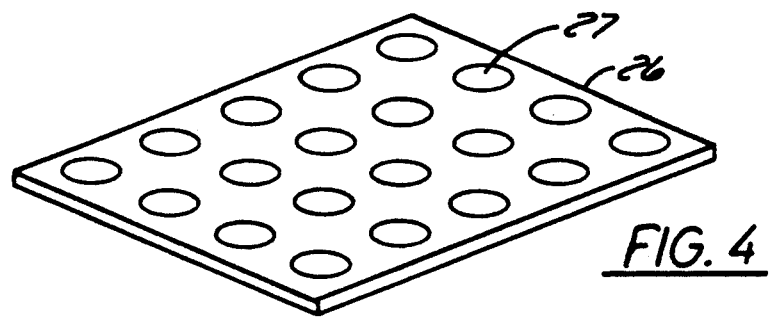
FIG. 4 is a schematic of the microlens array of the present invention.

In a lens with a Fresnel number of one, the thickness in the center of the lens is only half a wavelength thicker than that on the edge of the lens. The microlens may be fabricated by coating their centers with a $\pi$ phase shift coating, as shown in FIG. 4.

Corresponding to each microlens 27 on the microlens array 26 is an absorbent channel 29 on the exemplary pixel axis 11' in absorbent channel array 28. Each absorbent channel 29 in the absorbent channel array 28 may comprise a material which absorbs the wavelength of light used in the microscope be it visible, IR, UV, or another wavelength. The diameter of each channel 29 in the absorbent channel array 28 may preferably correspond to the diameter of each microlens 27 in the microlens array 26.

Pinhole array 30 may comprise a substrate having fabricated therein pinholes by laser or other conventional microlithography techniques. The microlens array 26, absorbent channel array 28, and pinhole array 30 must be carefully aligned to preferably within $100\mu$ to ensure alignment of each microlens, channel, and pinhole on exemplary pixel axis 11' in each pixel filter. This alignment may be accomplished using a conventional lithography aligner which is capable of alignment down to at least $5\mu$.

The relative positions of the object focal plane 12, objective lens 14, and image focal plane 22 are in accordance with the following well known lens equation:

$$\frac{1}{x} + \frac{1}{y} = \frac{1}{L} \qquad \text{(Eq. 1)}$$

where x is the distance between the object focal plane 12 and the objective lens 14, y is the distance between the objective lens 14 and the image focal plane 22, and L is the focal length of the objective lens 14.

Figure 5:
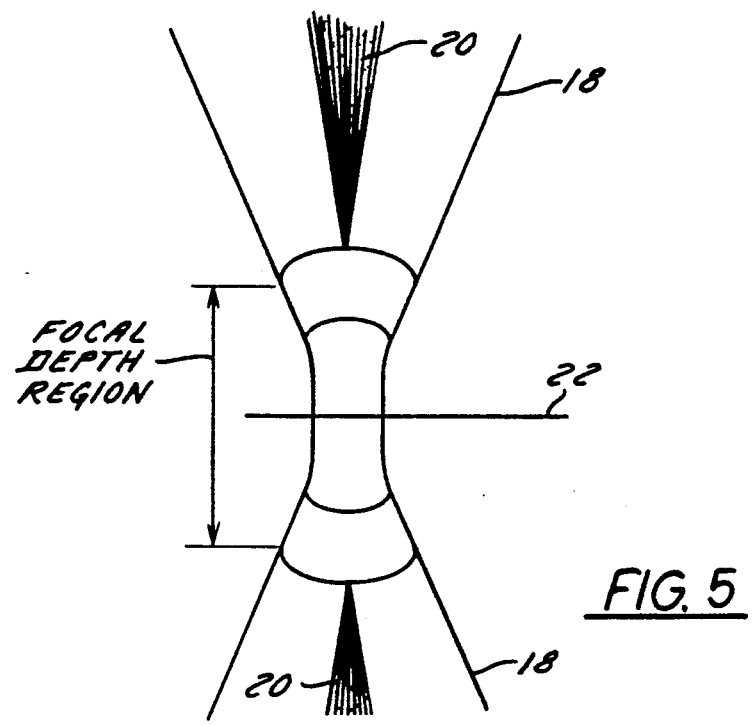
FIG. 5 is a schematic of the profile of a focused beam from a point object.

Before discussing the operation of the nonscanning sectioning microscope of the present invention, it is beneficial to discuss the profile of the light cone 18 from an on-axis object element as illustrated in FIG. 5. Shown in FIG. 5 is light cone 18, shadow cone 20, and image focal plane 22. Due to diffraction, there is a region of finite focal depth around the image focal point. Geometrical optics theory can be applied to show that the central diaphragm 16 projects a shadow cone along the axis on either side of the focal depth region. The primary portion of the shadow cone 20 originates at the diaphragm and terminates at a vortex substantially coinciding with the focal depth region boundary nearest the diaphragm. The shadow cone is then re-established as a secondary portion along the axis at the remaining focal depth region boundary located at the image focal plane and is the mirror image of the upper portion of the shadow cone. Within the focal depth region, the wavefront curvature varies from finite at the focal depth region boundary nearest the diaphragm, to zero at the focal depth region boundary at the image focal plane. Planar wavefronts exist at the image focal plane. A full discussion of light beam profiles can be found in M. Born and E. Wolf, "Principles of Optics," Pergamon Press 1980, at Section 8.8 entitled "The 3-Dimensional Light Distribution Near Focus."

Figure 6:
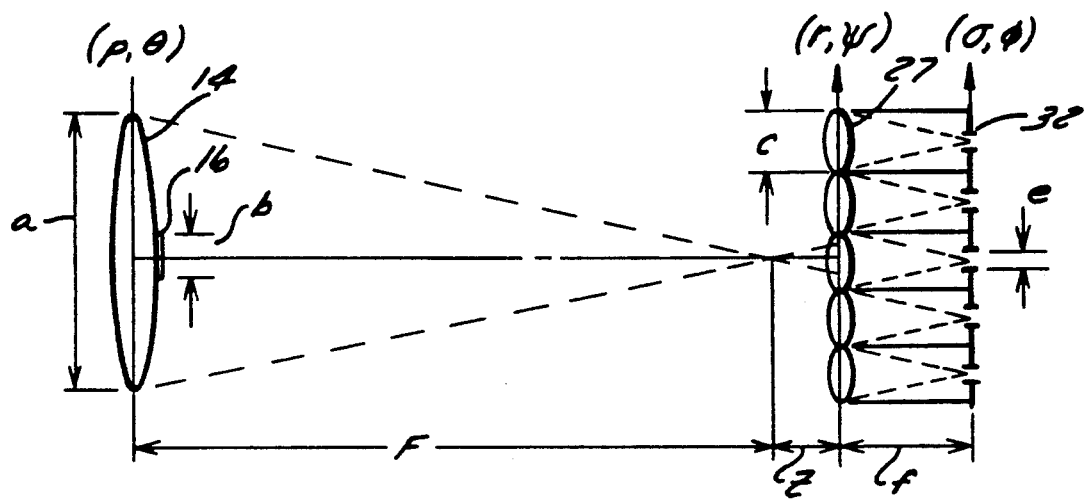
FIG. 6 is a schematic illustrating the geometry of the double-diffraction in the microscope of the present invention.

The light focused or diffracted by the objective lens 14 is refocused by the microlenses 27. This diffraction process can be analyzed by scalar diffraction theory. The geometry of a system with a defocused z is represented in FIG. 6. Suppose a, b, c, e are the diameters of the objective lens 14, the central diaphragm 16, the microlenses 27 and the pinholes 31 on the output image plane 32, respectively. F, f are the image distance ID of the objective lens (that is, the distance from objective lens 14 to image plane 22) and the focal length of the microlens, respectively, while z is the defocus distance from the image focal plane 22 to the microlens 27 and $(\rho, \theta)$, $(r, \psi)$, $(\sigma, \phi)$ are the polar coordinate systems on the objective lines plane, microlens plane and the output image plane. Define the following normalized coordinates, $$u = \frac{2\pi}{\lambda}\left(\frac{a}{F}\right)^2 z \qquad \text{(Eq. 2)}$$

$$v = \frac{2\pi}{\lambda}\left(\frac{a}{F}\right)r. \qquad \text{(Eq. 3)}$$

Without the central diaphragm, the field from an on-axis point is diffracted by the objective lens according to $$\widehat{W}(u,v) = C(u,v) - iS(u,v). \qquad \text{(Eq. 4)}$$

$$C(u,v) = 2\int_0^1 J_o(v\rho)\cos\left(\frac{1}{2}u\rho^2\right)\rho d\rho,$$

$$S(u,v) = 2\int_0^1 J_o(v\rho)\sin\left(\frac{1}{2}u\rho^2\right)\rho d\rho.$$

These integrations may be evaluated in terms of Lommel functions. With the central diaphragm, however, the diffraction field of the objective lens can be expressed as $$W(u,v) = \widehat{W}(u,v) - \widehat{W}\left(\frac{b^2}{a^2}u, \frac{b}{a}v\right) = \qquad \text{(Eq. 5)}$$

$$\left[C(u,v) - C\left(\frac{b^2}{a^2}u, \frac{b}{a}v\right)\right] - i\left[S(u,v) - S\left(\frac{b^2}{a^2}u, \frac{b}{a}v\right)\right].$$

For the second diffraction (by the microlens), the field on the output pinhole plane, $j_{oo}(u,\sigma)$, can be expressed by the Fourier-Bassel transform of W(u,v), $$j_{oo}(u,\sigma) = 2\pi \int_0^{v_0} vW(u,v) J_o\left(\frac{F\sigma}{fa}v\right)dv \qquad \text{(Eq. 6)}$$

where $v_0 = 2\pi/\lambda(a/F)c$. The light intensity for the on-axis output pixel, $I_{oo}(u)$ can be written in terms of an integration over the pinhole area as follows:

$$I_{oo}(u) = \int_0^E |j_{oo}(u,\sigma)|^2 \sigma d\sigma. \qquad \text{(Eq. 7)}$$

Similarly, the output light power from an off-axis pixel, $I_{mn}(u)$ can be calculated.

To characterize the sectioning capability of the system, the light power from the point source collected by all pixels is summed up. The total power received on the output plane is the summation of $I_{mn}(u)$ over all pixels, that is $$I(u) = \sum_m \sum_n I_{mn}(u). \qquad \text{(Eq. 8)}$$

The variation of this total power I(u), as a function of the normalized defocus, $u = 2\pi/\lambda(a/F)^2 z$, represents the depth discrimination, or sectioning capability of the microscope.

Figure 1:
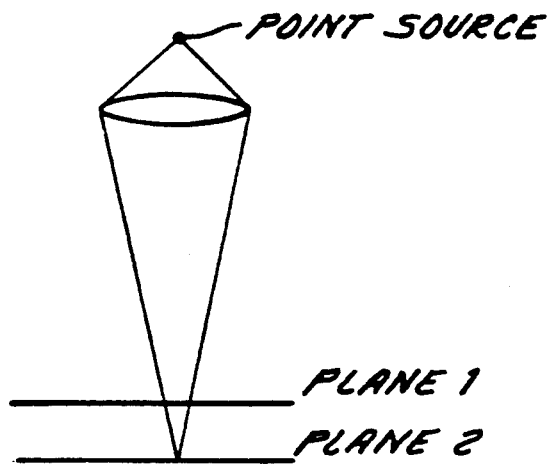
FIG. 1 is a schematic illustration of a conventional microscope appropriately labelled Prior Art.
Figure 2:
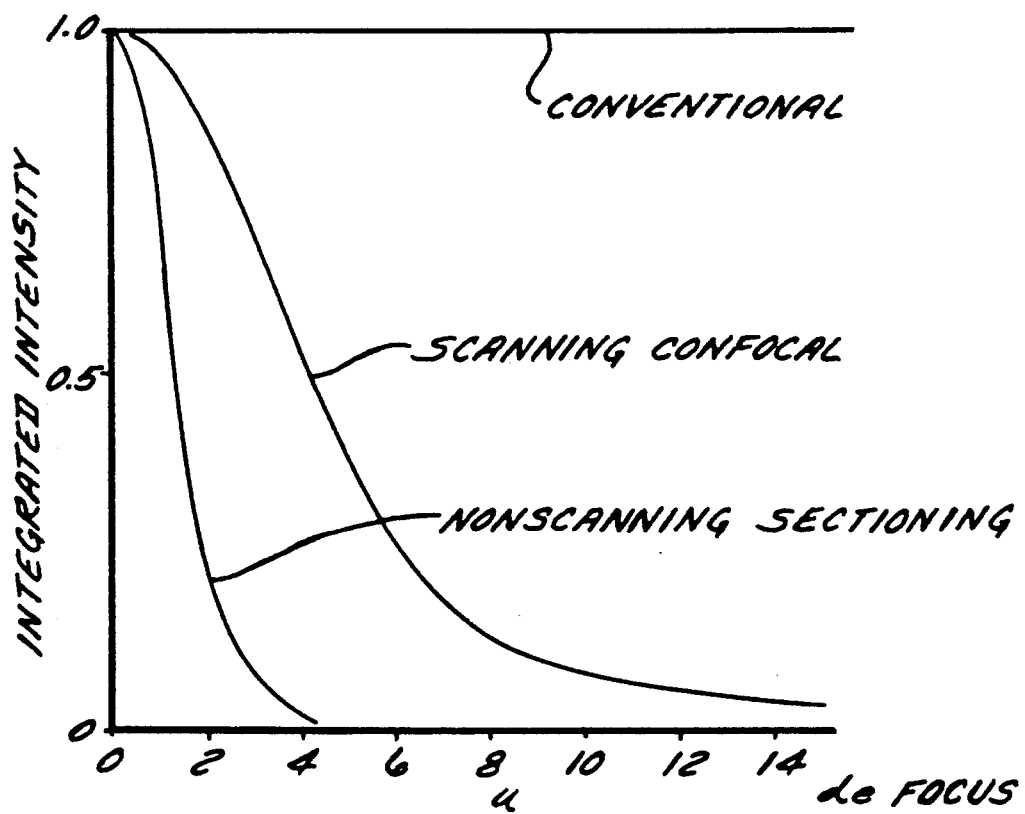
FIG. 2 is a chart showing the variation of integrated intensity with defocus for prior art conventional and confocal microscopes, and the nonscanning sectioning microscope of the present invention.
Figure 7:
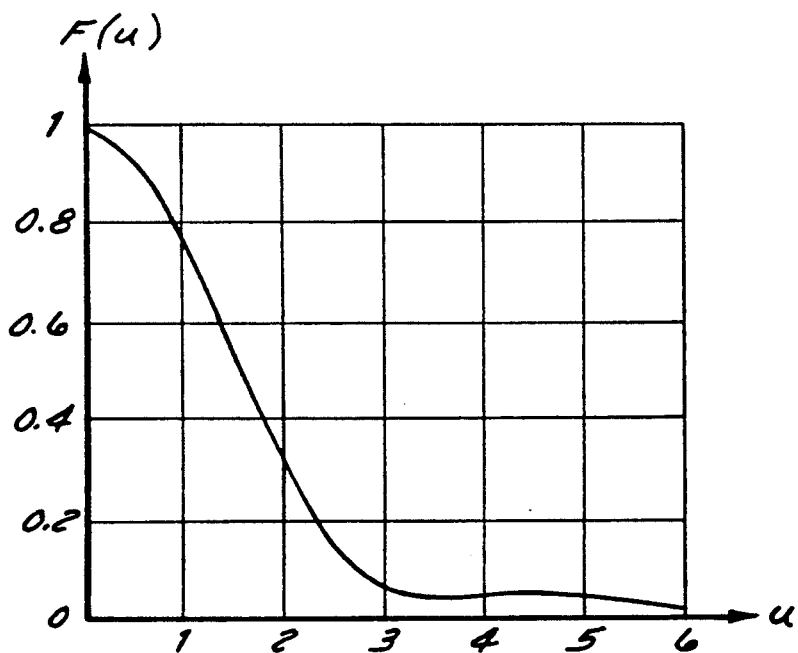
FIG. 7 is a graph showing the variation of intensity along the boundary of the shadow cone.

FIG. 7 shows the calculated intensity variation along the boundary of the geometric shadow. The curve indicates that the intensity outside the focal depth region ($|u|>3$) is very small. This means that the geometric shadow can be applied outside the focal depth region. Therefore the shadow of the central diaphragm can reach to the point $|u|=3$. This shows that very little light energy from a defocus plane, ($u \geq 3$), enters into the output image. The sharp defocus response of the nonscanning sectioning microscopes of the present invention is shown in FIG. 2. Notice that for a confocal microscope, when $u=3$, 70% of the power still contributes to the output image. Therefore, a much better depth discrimination capability may be achieved with the microscope of the present invention than with a confocal microscope.

In operation, the object focal plane 12 on the 3-D object is chosen by preselecting the distance x measured from the objective lens 14. The distance x is selected by setting the distance y between the objective lens 14 and the image focal plane 22 by translating the objective lens 14 toward or away from the image focal plane 22 ("depth scanning"). The necessary distance x is in accordance with the well-known lens equation 1 set out above.

Light of the appropriate wavelength incident upon an object element on the object specimen is reflected or transmitted and incident upon the objective lens 14 which diffracts or focuses the light into light cone 18 and toward the image focal plane 22. The central diaphragm 16 blocks the central portion of the light cone 18 creating shadow cone 20 which extends toward the image focal plane 22. There is an absence of light in the shadow cone 20.

Figure 8A:
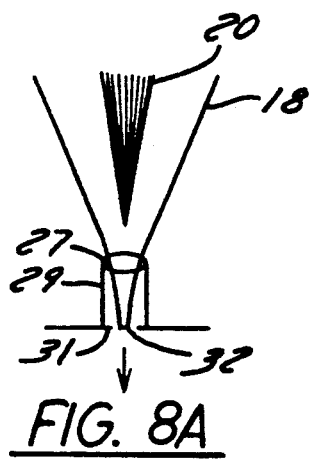
FIGS. 8A-E illustrate schematically the on-focus (8A), within focus depth (8B-C), and out-of-focus (8D-E) attenuation of the microscope of the present invention.

When light from an object element in the predetermined object focal plane is incident the pixel filter array 24, the image focal plane 22 coincides with exemplary microlens 27 of the microlens array 26, and the microlens refocuses the plane wavefront of the focused spot and directs the beam through the corresponding absorbent channel 29 of the absorbent channel array 28 and through the corresponding pinhole 31 of the pinhole array 30 with small attenuation. This can be seen in FIG. 8A which is the on-focus small attenuation case.

Figure 8B:
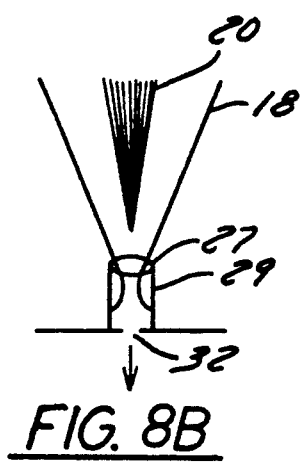
Figure 8C:
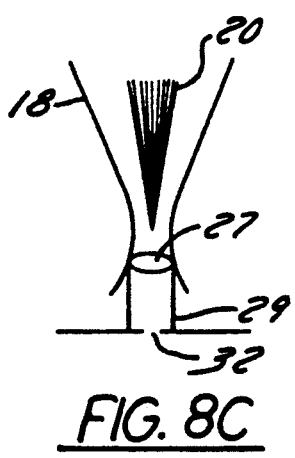

When light from an object element somewhat outside the predetermined object focal plane is incident the pixel filter array, the microlens 27 of the microlens array 26 is off the image focal plane but within the focal depth region as shown in FIGS. 8B and C. The microlens 27 will diverge the light cone, which at that point consists of a finite wavefront curvature. The diverging beam is absorbed by the absorbent channel 29 walls, causing high attenuation, thereby insuring depth discrimination within the focal depth region because very little light will pass through the corresponding pinhole 31 of the pinhole array 30. Consequently, any detector at the pinhole array 30 will register no or extremely low light intensity. Thus, even in the focal depth region, due to the wavefront curvature variation with depth in the light cone near the focal point, the pixel filter array 24 provides high depth discrimination.

Figure 8D:
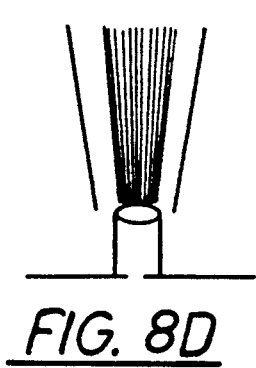
Figure 8E:
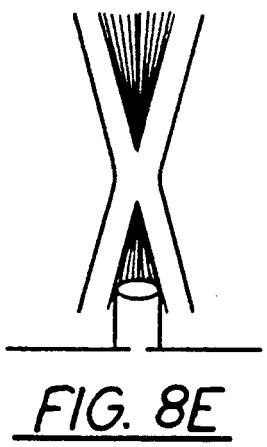

When light from an object element well outside the predetermined object focal plane is incident the pixel filter array, the exemplary microlens 27 of the microlens array 26 is off the image focal plane and outside the focal depth region and in either shadow cone 20 as seen in FIGS. 8D and E. In such a case, no light can enter the pixel filter or be transmitted to the output image plane 32. Consequently, it can be seen that each central diaphragm 16 insures depth discrimination outside the focal depth region.

Figure 9:
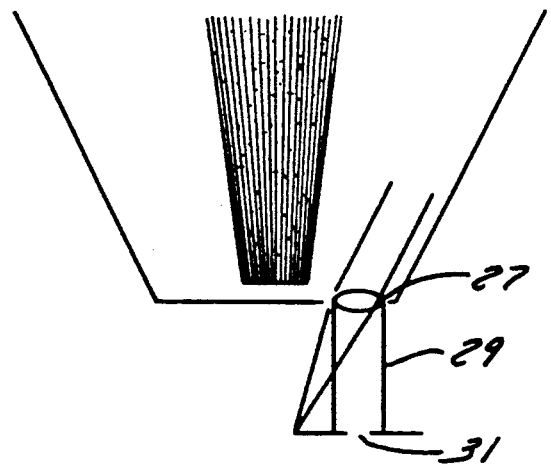
FIG. 9 illustrates attenuation of light from an off-axis point source.

The nonscanning sectioning microscope of the present invention also insures that off-axis light is discriminated against. In the off-axis case the microlens 27 is not on the axis of the light cone 18 and the microlens 27 may be in the light cone but at an out-of-focus plane as shown in FIG. 9. Because the light source is off the axis of the microlens 27, its image, as formed by the microlens, will not be on the output pinhole 31 so that no off-axis light is transmitted to the output image plane. The off-axis light is absorbed by the corresponding absorbent channel 29. Consequently, it can be seen that each pixel filter of the pixel filter array 24 not only provides depth discrimination both within and without the focal depth region but rejects off-axis light as well. The channel 29, located on the pixel axis 11', acts as a channel means which cooperates with a filter of the pixel filter array 24 (acting as a second lens means) so as to absorb first unwanted light from object elements outside of the object focal plane 12 falling on the pixel filter, and not blocked by diaphragm 16, and so as to absorb second unwanted light not on the pixel axis 11'. Each pinhole 31 of the pinhole array 30 acts as a pinhole means on an associated pixel axis 11' and cooperates with the second lens means and channel means for preventing the first and second unwanted light from reaching the output image plane 32 but allowing the refocused light from object elements in the object focal plane 12 to reach the output image plane 32.

Figure 10A:
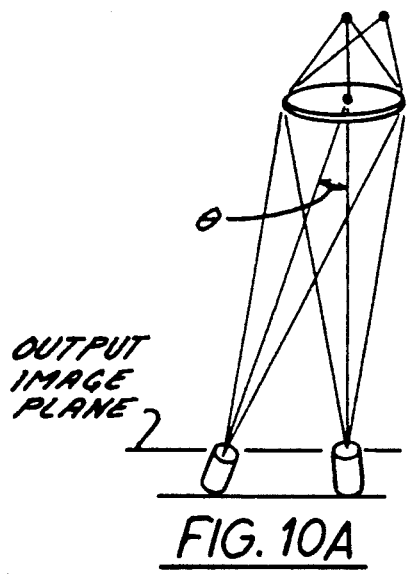
FIGS. 10A and B illustrate the correction of skew light rays by skewing the corresponding pixel filter and by employing a field lens above the pixel filter array respectively.

As discussed above, even in the focal depth region, due to the wavefront curvature variation with depth as shown in FIG. 5, the pixel filter array provides high depth discrimination. For an object element of the object specimen not on the central axis 11 of the objective lens 14, a light ray falling on the output image plane 32 is not perpendicular to it but makes an angle $\theta$ to the central axis 11, where 8 is equal to the field angle of this object element as shown in FIGS. 10A and B. It is preferred that the corresponding pixel filter (comprising the corresponding microlens, absorbent channel, and pinhole combination) is parallel to the skewed light ray. This may be achieved by positioning the pixel filters at the angle $\theta$ to the central axis, which complicates fabrication of the pixel filter array as seen in FIG. 10A.

Figure 10B:
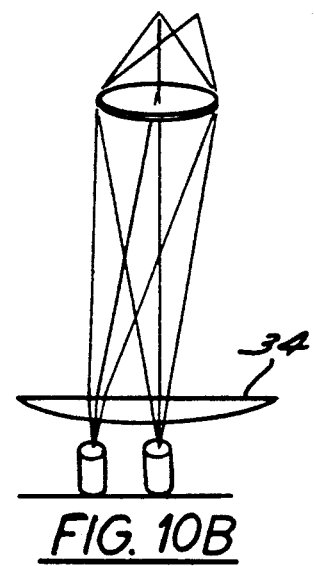
Figure 11:
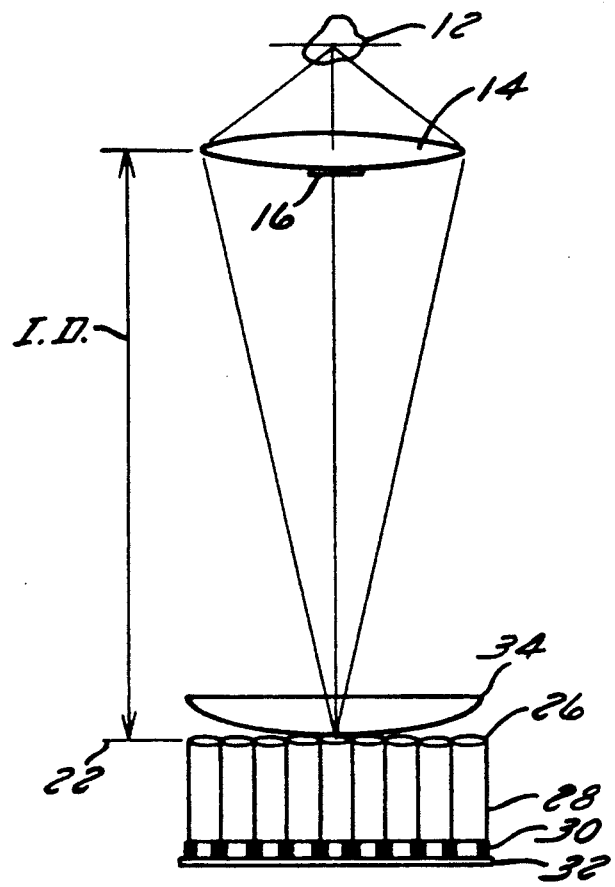
FIG. 11 is a schematic of a nonscanning sectioning microscope of the present invention employing a field lens.

In a preferred embodiment, skewed light rays may be corrected for without complicating the fabrication process, by employing a field lens 34 at the pixel filter array as seen in FIG. 10B. The focal length of the field lens 34 may preferably be equal to the distance ID between the objective lens 14 and the image focal plane 22, or an equivalent in a complicated, multi-lens imaging system. The field lens 34 ensures that the central light rays of the light cones from all object elements will be parallel to the axis of the objective lens 14, and all corresponding pixel filters of the pixel filter array 24 may be perpendicular to the output image plane 32, as shown in FIGS. 10B and 11. This greatly simplifies the fabrication of the pixel filter array 24. Thus, all central light rays from any point on the sample passing through the center of the object lens 14 will be parallel to the central axis and perpendicular to the image focal plane 22.

Figure 12:
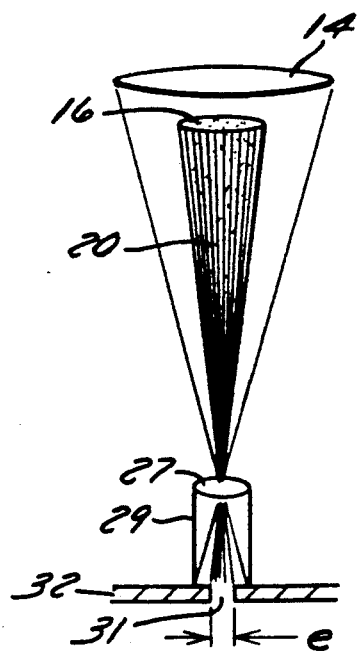
FIG. 12 is a schematic illustrating the complementary design of a diaphragm and pinhole of a pixel filter array of a microscope of the present invention.
Figure 13:
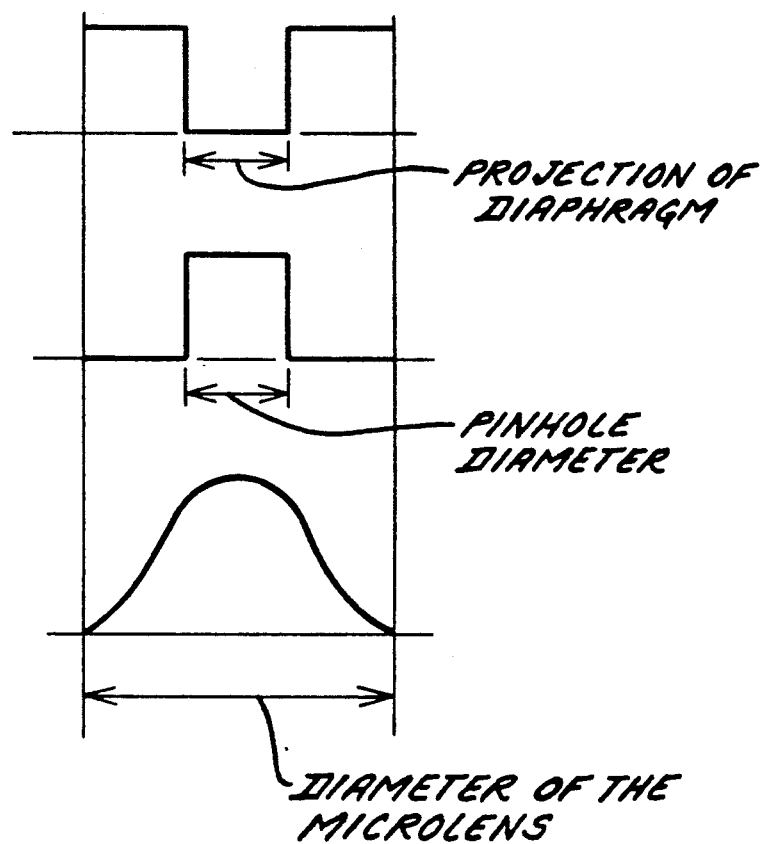
FIG. 13 is a schematic illustrating the relative sizes of a diaphragm, pinhole, and microlens of the pixel filter array of the present invention.

The complimentary design of the diaphragm 16 and the pinholes in the pinhole array 30 is illustrated in FIGS. 12 and 13 and is further described below. Because the diameter of the pixel filters is preferably equal to the Airy spot size and the Fresnel number of the microlenses is equal to 1, the geometric projection of the aperture of the objective lens 14 on the output image plane 32 is equal to the diameter of the absorbent channels 29. From a geometric point of view, to achieve maximum sectioning capability, the size of the pinholes 31 may preferably be equal to the projected shadow cone 20 of the central diaphragm 16 on the output image plane 32 as depicted in FIG. 12. This complementary design gives a maximum depth discrimination against out-of-focus light and off-axis light.

For in-focus and on-axis light, an Airy spot is formed on the output image plane 32 by the microlens 27. The Airy spot fills the whole diameter of the output aperture of the absorbent channels. Only the central portion of the Airy spot can pass through the corresponding pinhole 31 and contribute to the output image as shown in FIG. 12.

The attenuation of the in-focus and on-axis light is dependent on the size of the central diaphragm 16 and on the size of the pinhole 31. When the diameter of the diaphragm is reduced, more light can pass through objective lens 14. The pinhole size has to be reduced, however, according to the complementary design, and vice versa. An optimal selection of the pinhole size, or the diaphragm size, can be derived.

It is to be understood that embodiments of the present invention not disclosed herein are fully intended to be within the scope of the claims.

I claim:

1. A device for microscopic sectioning and imaging of an object specimen illuminated with light, the device having an object focal plane, an image focal plane, and an output image plane, the device comprising: objective lens means for focusing light in a path leading from the object specimen to the image focal plane;

diaphragm means, located within the path of focused light, for blocking a portion of the light from the objective lens means and creating a shadow which is surrounded by said focused light; and pixel filter means having an axis and arranged so as to cooperate with the shadow so that substantially only light from the objective lens means and parallel to the pixel filter means axis reaches the output image plane.

2. A device for microscopic sectioning and imaging of an object specimen illuminated with light, the device having a predetermined object focal plane, a central axis, an image focal plane, and an output image plane, the device comprising:

objective lens means on the central axis for focusing light from the object specimen to the image focal plane, the objective lens means having an entrance pupil plane;

diaphragm means on the central axis and at the entrance pupil plane for blocking a portion of the light from the objective lens means and creating a shadow cone which is positioned on the central axis and which decreases in diameter from said diaphragm means towards said image focal plane;

a pixel filter array including a plurality of pixel filters, each pixel filter having a pixel axis and lens means, absorbent channel means and pinhole means aligned on the pixel axis;

the pixel filter array arranged so as to cooperate with the shadow cone so that substantially only light from the objective lens means and parallel to a pixel axis reaches the output image plane.

3. A device for microscopic sectioning and imaging of an object having object elements illuminated with light, the device having an object focal plane and a central axis and comprising:

first lens means on the central axis for focusing light from the object elements to an image focal plane;

second lens means for refocusing light from object elements in the object focal plane at the image focal plane to an output image plane, the second lens means having a pixel axis;

diaphragm means on the central axis, which cooperates with the second lens means to block light from object elements outside the object focal plane from reaching the second lens means;

channel means on the pixel axis, which cooperates with the second lens means, for absorbing a first unwanted light from object elements outside the object focal plane falling on the second lens means, and not blocked by the diaphragm means, and for absorbing a second unwanted light which is not parallel to the pixel axis; and pinhole means on the pixel axis, which cooperates with the second lens means and channel means for preventing the first and second unwanted light from reaching the output image plane but allowing the refocused light from object elements in the object focal plane to reach the output image plane.

4. A device for microscopic sectioning and imaging of an object having object elements illuminated with light, the device having a predetermined object focal plane and an output image plane and comprising:

object imaging means having an entrance pupil plane, for imaging an object element in the predetermined object focal plane to an image focal plane and forming a light cone, the light cone having an axis and a focal depth region substantially coinciding with the image focal plane;

diaphragm means located on the axis and at the entrance pupil plane for creating a shadow cone within the light cone, the shadow cone having a vertex, the vertex substantially coinciding with the focal depth region;

a pixel filter array including a plurality of pixel filters each having a pixel filter axis which includes (1) microlens array means, (2) absorption channel array means, and (3) pinhole array means;

the microlens array means being located at the image focal plane and having a plurality of microlenses;

the absorption channel array means having a plurality of absorption channels each corresponding to a microlens;

the pinhole array means having a plurality of pinholes each corresponding to an absorption channel and its corresponding microlens;

the diaphragm means and the pixel filter array arranged so as to discriminate against a first unwanted light from object elements outside of the predetermined object focal plane and a second unwanted light not on a pixel filter axis and substantially prevent the first and second unwanted light from entering the output image plane.

5. The device as defined in claim 4 further characterized by field lens means substantially at the image focal plane for ensuring paraxiality of light with respect to a pixel filter axis.

6. A device for microscopic sectioning and imaging of an object specimen having object elements illuminated by light, the device having a predetermined object focal plane, a central axis, and an output image plane, the device comprising:

first lens means on the central axis upon which light from the object specimen is incident and for imaging object elements in the predetermined object focal plane to an image focal plane and for forming a cone of light, the cone of light having a central portion on the central axis and an image focal point, and a region of finite focal depth around the image focal point, the region having an upper boundary nearest a diaphragm and a lower boundary at the image focal plane;

diaphragm means located at the first lens means for blocking the central portion and generating a shadow cone outside the focal depth region along the central axis;

a plurality of second lens means upon which the cone of light is incident;

a plurality of absorbent channel means corresponding to the plurality of second lens means;

a plurality of pinhole means corresponding to the plurality of absorbent channel means;

the diaphragm means, second lens means, channel means, and pinhole means cooperating so that 1) when light from an object element in the predetermined object focal plane is incident the second lens means, the second lens means is located at the image focal plane and refocuses the cone of light and directs it through the pinhole means to the output image plane;

2) when light from an object element outside the predetermined object focal plane is incident the second lens means and the second lens means is off the image focal plane and within the focal depth region, the second lens means diverges the cone of light, and the diverged light is absorbed by the absorbent channel means and does not substantially reach the output image plane, and 3) when light from an object element outside the object focal plane is incident the second lens means and the second lens means is located outside the focal depth region and within the shadow cone, virtually no light is transmitted to the output image plane.

7. A method of microscopic sectioning and imaging of an object specimen illustrated with light using an imaging device, said device having an axis, an object focal plane, an image focal plane, and an output image plane, said method comprising the steps of:

focusing light in a path leading from said object specimen towards said image focal plane;

blocking a portion of said focused light and creating a shadow which is surrounded by said focused light; and filtering said focused light, through a pixel filter which has an axis and which cooperates with said shadow, such that substantially only light from said object focal plane and parallel to said pixel filter axis reaches said output image plane.

8. The method as defined in claim 7, wherein said filtering step comprises absorbing first unwanted light from outside said object filter plane and absorbing second unwanted light which is not parallel to said pixel filter axis.

9. The method as defined in claim 7, wherein said step of focusing comprises focusing said light to a focusing point surrounded by a finite focal depth region, and wherein said step of blocking comprises projecting symmetrical shadows outside of said focal depth region.

10. The method as defined in claim 7, wherein said step of blocking a portion of said focused light comprises creating a shadow cone which is positioned on said central axis and which decreases in diameter from a diaphragm towards said image focal plane.

* * * * *

UNITED STATES PATENT AND TRADEMARK OFFICE
CERTIFICATE OF CORRECTION

PATENT NO. : 5,260,826
DATED : Nov. 9, 1993
INVENTOR(S) : Wu

It is certified that error appears in the above-identified patent and that said Letters Patent is hereby corrected as shown below:

Col. 11, line 28, delete "illustrated" and substitute therefore
-- illuminated --.

Signed and Sealed this

Nineteenth Day of April, 1994

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,260,826
DATED : November 9, 1993
INVENTOR(S) : Wu

It is certified that error appears in the above-indentified patent and that said Letters Patent is hereby corrected as shown below:

Column 1, line 2, insert the following information:

-- This invention was made with Government support under contract NAS8-39837 awarded by NASA. The Government has certain rights in this invention. --

Signed and Sealed this

Thirteenth Day of June, 1995

Attest:

BRUCE LEHMAN

*Attesting Officer*  *Commissioner of Patents and Trademarks*